July 1, 1924.
A. H. KRUEGER
TRACTOR HITCH
Filed March 19, 1923
1,499,669
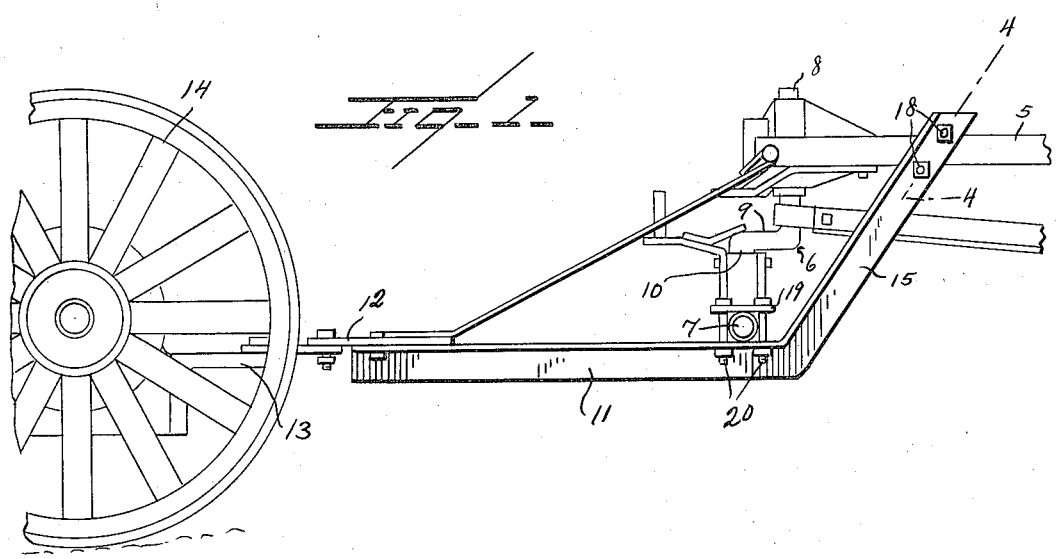
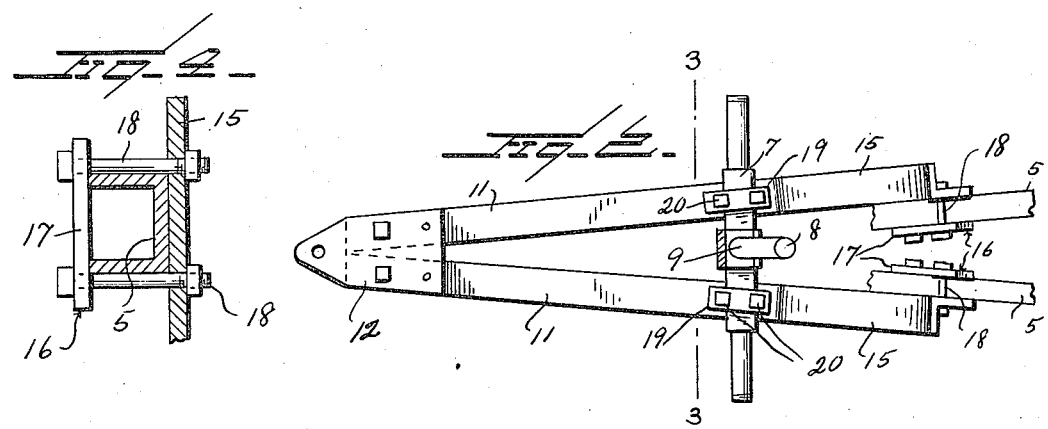
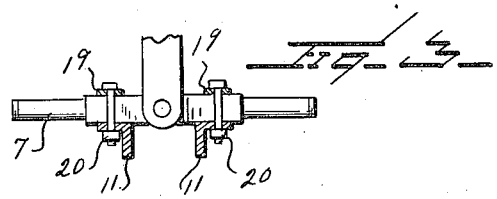
INVENTOR.
A. H. Krueger
BY Watson E. Coleman
ATTORNEY.

Patented July 1, 1924.

1,499,669

UNITED STATES PATENT OFFICE.

AUGUST H. KRUEGER, OF LURAY, KANSAS.

TRACTOR HITCH.

Application filed March 19, 1923. Serial No. 626,081.

*To all whom it may concern:*

Be it known that I, AUGUST H. KRUEGER, a citizen of the United States, residing at Luray, in the county of Russell and State of Kansas, have invented certain new and useful Improvements in Tractor Hitches, of which the following is a specification, reference being had to the accompanying drawings.

This invention relates to certain new and useful improvements in hitches, and has particular reference to the provision of a simple and efficient means for hitching a tractor to an agricultural machine whereby the latter may be effectively drawn by the tractor, with the tractive effort of the latter increased due to the placement of a portion of the weight of the agricultural machine upon the rear end of the tractor.

An object of the invention is to generally simplify and improve devices of the above character.

Still another object of the invention is to enable the expeditious and practical hitching of a tractor to the forward end of an agricultural machine in such manner and by such means as to render modification of the structure of the agricultural machine unnecessary.

A still further object of the invention is to provide a hitch of the above kind embodying a hitch tongue of simple construction provided with means at its forward end for convenient pivotal connection with the draw bar of a tractor and including upwardly extending rear ends detachably clamped against the outer sides of members of the agricultural machine frame, and further clamps for securing the projecting forward end of the machine upon the hitch bar or tongue whereby the latter effectively supports the frame of the machine in the proper horizontal position with the front wheels of the machine dispensed with so that such weight of the forward end of the machine is imposed upon the rear traction wheels of the tractor for increasing their tractive effort.

With the above general objects in view, and others that will become apparent as the nature of the invention is better understood, the same consists in the novel form, combination and arrangement of parts hereinafter more fully described, shown in the accompanying drawings, and claimed.

In the drawings, wherein like reference characters indicate corresponding parts throughout the several views:—

Figure 1 is a side elevational view showing one form of the present invention employed for hitching a tractor to a combined harvesting and threshing machine;

Figure 2 is substantially a top plan view of the device shown in Figure 1 with parts removed and broken away;

Figure 3 is a transverse sectional view on line 3—3 of Figure 2;

Figure 4 is an enlarged sectional view on line 4—4 of Figure 1;

Referring more in detail to the several views, the commercial form of combined harvesting and threshing machine most widely used, as shown in Figure 1, embodies a horizontal frame including side frame bars 5 which converge forwardly, and from the forward ends of which depends a supporting member 6 for the transverse axle 7 of a so-called pony truck, it being understood that supporting wheels are ordinarily suitably retained upon the projecting ends of the axle 7 for free rotation. The supporting member 6 usually comprises a depending upper arm 8, from the lower end of which a horizontal arm 9 forwardly projects, a further depending or vertical lower arm 10 being extended from the forward end of the arm 9 and having the axle 7 suitably connected to its lower end so that the axle lies transversely of the machine.

The present invention embodies an elongated beam or tongue which preferably consists of a pair of members 11 preferably constructed from angle iron and disposed in forwardly converging relation with their forward ends suitably rigidly connected. The tongue members 11 have a means, generally denoted by the numeral 12, suitably secured to their forward ends and adapted for pivotal connection in any suitable manner to the rear end of the draw bar 13 of a tractor 14.

The rear ends of the tongue members 11 extend at an upward and rearward inclination, as at 15, and these ends are spaced a sufficient distance apart so as to lie flatly against the outer faces of the frame members 5 at their upper ends. The upper ends of the tongue portions 15 are suitably clamped in this position to the machine frame members 5 by means of clamps, generally denoted by the numeral 16, which may embody plates 17 arranged against the inner faces of the frame members 5 and having bolts 18 passing through the upper ends of the portions 15 and the plates 17 directly above the upper edge of each frame member 5 and directly below the lower edge of each of said frame members 5. When the rear ends of the tongue are secured in this manner, the ends of the axle 7 are disposed to rest upon the horizontal portions of the tongue members 11 at a point slightly forwardly of the point of connection of the inclined portions 15 with the horizontal portions of the tongue members 11.

As will be seen from the several views, the tongue members 11 have inwardly positioned, vertical flanges and upper, outwardly directed horizontal flanges. The ends of the axle 7 are tightly bolted to the horizontal flanges of the tongue members 11 by means of suitable clamps, generally denoted by the numeral 19, which may be of any preferred or conventional form, and which embody bolts 20 whereby the clamps may be readily applied or removed.

With the hitch applied as above described, the forward end of the machine will be supported at the proper elevation and, as the usual supporting wheels are removed from the ends of the axle 7, the weight of the forward end of the machine is transmitted by the hitch tongue to the rear end of the tractor so that the tractive effort of the rear traction wheels of the tractor is increased.

It will be seen that this entire hitch may be securely fastened to the harvester thrasher without loosening a nut or bolt on the harvester thrasher. There are no holes to drill and no bolts to change in order to attach this hitch, while at the same time I place a weight of about 500 pounds on the tractor. It will be seen that this hitch is particularly rigid and forms a firm support for the machine and that it forms a rigid connection between the tractor and the machine so that the tractor and machine may be backed together or move forward together, and that the construction is such as to permit a free turning movement of the tractor with relation to the machine.

From the foregoing description, it will be seen that I have provided a very simple, durable and efficient means for the purpose outlined above, wherein the hitch tongue may be readily applied or removed without substantial modification of the machine construction.

Minor changes may be made without departing from the spirit and scope of the invention as claimed.

I claim:—

1. As an article of manufacture, a hitch for connecting a tractor of the type stated to the forward end of an agricultural machine of the character shown, wherein said machine embodies a frame and wherein a depending member is supported from the forward end of the frame, including a tongue provided with means at its forward end for connection with the draw bar of a tractor, said tongue embodying a forward portion adapted to assume a substantially horizontal position when in use and an upwardly extending rear portion, with the rear end of the horizontal portion disposed to receive said depending member thereon, means detachably rigidly securing the upper end of the rear portion of the tongue to the machine frame rearwardly of its forward end, and means detachably and rigidly fastening said depending member to the horizontal portion of the tongue.

2. As an article of manufacture, a hitch for connecting a tractor to the forward end of an agricultural machine of the type shown, wherein said machine embodies a frame and wherein a depending member is supported from the forward end of the frame, including a tongue provided with means at its forward end for connection with the draw bar of a tractor, said tongue embodying a forward portion adapted to assume a substantially horizontal position when in use and an upwardly extending rear portion, with the horizontal portion disposed to receive said depending member thereon, means detachably rigidly securing the upper end of the rear portion of the tongue to the machine frame rearwardly of its forward end, and means detachably and rigidly fastening said depending member to the horizontal portion of the tongue, said tongue further embodying forwardly converging members rigidly secured together at their forward ends and flatly engaging the outer faces of the side frame members of the machine at the rear upper ends of the upwardly extending rear end portion.

3. As an article of manufacture, a hitch for connecting a tractor to the forward end of an agricultural machine of the type shown comprising a tongue embodying forwardly converging members disposed side by side and rigidly connected at their forward ends, means at the forward end of the hitch tongue for connecting the latter to the draw bar of the tractor, said tongue members including forward, substantially horizontal portions and upwardly extending rear portions, means to detachably rigidly secure the forward end portion of the machine upon the horizontal portions of the tongue, and means to detachably and rigidly secure the upper ends of the rear upwardly extending tongue portions against the outer faces of the side frame members of the machine.

4. As an article of manufacture, a hitch for connecting a tractor of the character described to the forward end of an agricultural machine of the type described, comprising a structure constructed at its forward end for detachable and pivotal connection with the rear end of the tractor and having its intermediate portion formed to receive the forward end of the frame thereon, means for detachably securing the forward end of the machine on said structure, and means to detachably secure the rear end of the structure to the machine frame at a point rearwardly of the first named detachable securing means.

5. As an article of manufacture, a hitch for connecting a tractor of the character described to the forward end of an agricultural machine of the type described wherein the forward supporting wheels of the machine are dispensed with, embodying a substantially horizontal tongue provided with means at its forward end for detachable connection to the tractor and with an upwardly extending rear end provided with means for detachably connecting the same to the machine frame at a point rearwardly of the forward end of the said frame, and means to detachably secure a depending forward member of the machine upon said horizontal tongue whereby the weight of the forward end of the machine is placed upon the tongue.

6. As an article of manufacture, a hitch for connecting a tractor to the forward end of an agricultural machine of the character described wherein the forward supporting wheels of the machine are dispensed with, embodying a substantially horizontal tongue formed of forwardly converging angle irons, the angle irons at their rear ends extending upward and rearward from a horizontal portion which constitutes the forward portion of the angle irons, the tongue having means at its forward end for detachable connection to a tractor and the upper ends of the angle irons having clamps whereby these upper ends may be connected to the frame of the machine, and clamps adapted to detachably secure a depending forward member of the machine upon the angle irons whereby the weight of the forward end of the machine is placed upon the tongue.

7. The combination with a tractor and a harvester thrasher having side frame bars, a depending supporting member and a transverse axle carried at the lower end thereof, of means for entirely supporting the forward end of the harvester thrasher and connecting the forward end to the tractor comprising a pair of rearwardly divergent angle irons, the forward ends of which are connected, the angle irons forming a tongue, the forward portions of the angle irons being formed to provide a horizontal seat for the axle and the angle irons then extending upward and rearward, a clamp at the upper end of each angle iron adapted to embrace and be engaged with the frame of the machine, and clamps at the rear end of the horizontal portion of the angle irons adapted to engage with and hold the axle of the machine upon the tongue, the forward end of the tongue being provided with means whereby it may be connected to the draw bar of the tractor.

In testimony whereof I hereunto affix my signature.

AUGUST H. KRUEGER.